United States Patent [19]

Martin

[11] Patent Number: 4,599,821
[45] Date of Patent: Jul. 15, 1986

[54] FISHING LURE

[76] Inventor: James E. Martin, 10700 Calico La., Chardon, Ohio 44024

[21] Appl. No.: 746,136

[22] Filed: Jun. 18, 1985

[51] Int. Cl.⁴ ............................................. A01K 85/00
[52] U.S. Cl. ................................. 43/42.46; 43/42.22; 43/42.23
[58] Field of Search ................. 43/42.11, 42.13, 42.23, 43/42.39, 42.49, 42.26, 42.27, 43.13, 43.14, 42.22

[56] References Cited

U.S. PATENT DOCUMENTS

| | | | |
|---|---|---|---|
| 2,403,202 | 7/1946 | Woodward | 43/42.47 |
| 3,299,562 | 1/1967 | Bennecke | 43/42.39 |
| 4,471,556 | 9/1984 | Dworski | 43/42.47 |
| 4,486,970 | 12/1984 | Larson | 43/43.13 |

Primary Examiner—Nicholas P. Godici
Assistant Examiner—M. Jordan
Attorney, Agent, or Firm—Harlan E. Hummer

[57] ABSTRACT

A fishing lure is described as having a generally U-shaped body with a curved keel and flared front end to maintain the body in an upright position as the lure moves in the water and keep the lure from rotating as it moves.

14 Claims, 4 Drawing Figures

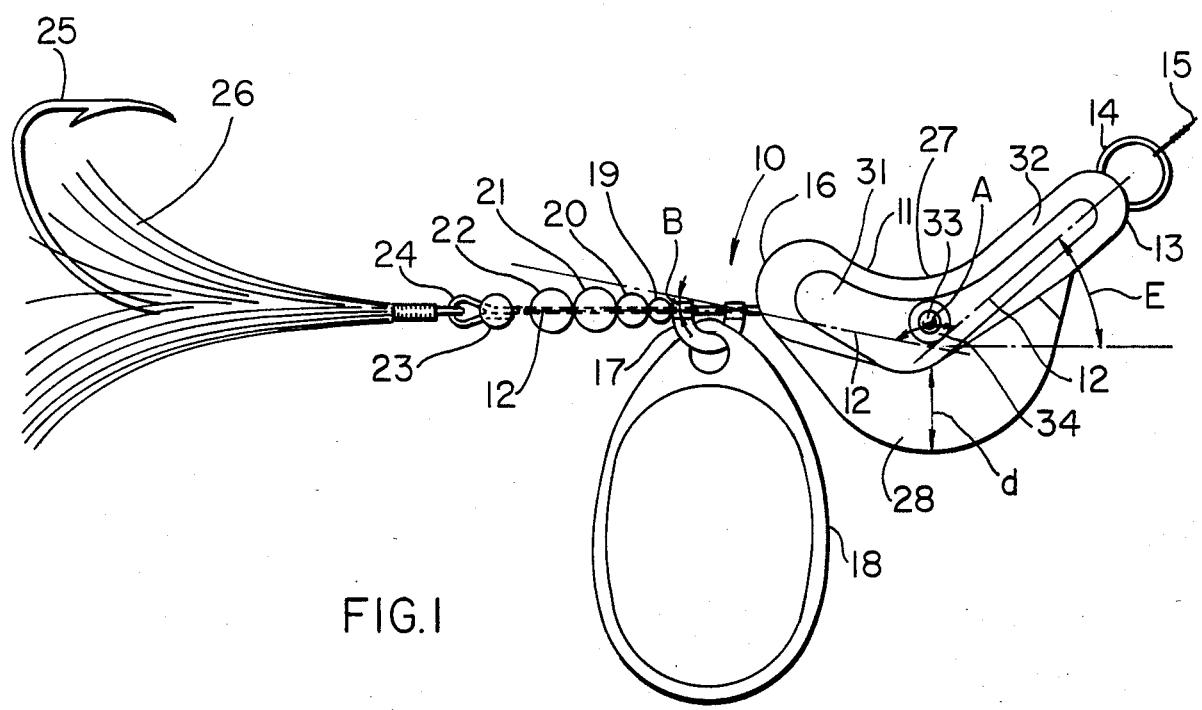
FIG.1
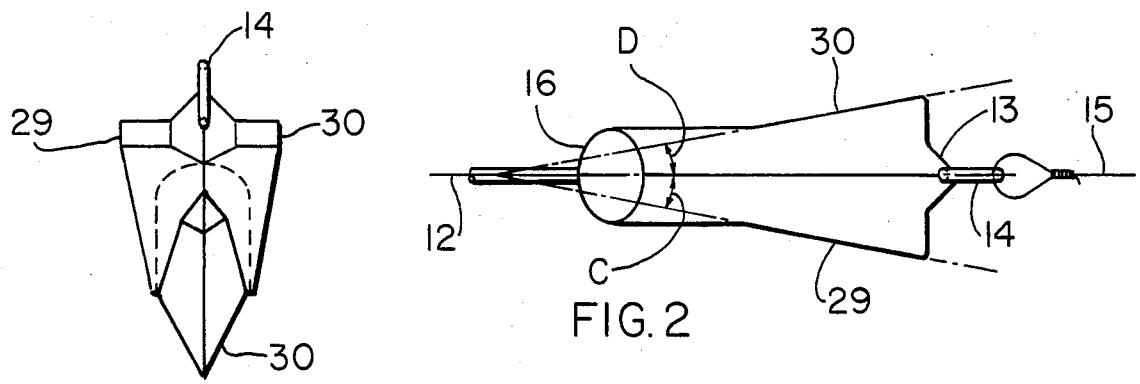
FIG.4
FIG.2
FIG.3

4,599,821

FISHING LURE

BACKGROUND OF THE INVENTION

The invention relates to a fishing lure, especially a fish-type lure for catching the specie of fish commonly called WALLEYE which has become prominent in Lake Erie and the other of the Great Lakes.

Fishing lures of this type, to be effective, should closely resemble the movements of the smaller species of fish upon which the Walleye feed. One of the most severe problems is controlling the motion of the lure as it moves through the water, especially the rotation of the lure, since such motion is unnatural and can cause horrible twisting of the fishing line which is attached to the lure. The problem of twisting the line can be overcome by using a snap and swivel assembly, but you take the chance of losing a big one if the snap is faulty or becomes undone. The invention is directed to solving this problem by the provision of a unique fishing lure which moves upright through the water and does rotate as other lures do.

Briefly stated, the invention is in a lure which has a novel U-shaped body with a downwardly curved keel for stabilizing the lure as it moves through the water, in much the same way that the keel of a sailboat acts to stabilize the sailboat and keep it from tipping over. The lure also has a unique front end which is flared outwardly and causes the body to wiggle from side-to-side as it travels through the water.

DESCRIPTION OF THE DRAWING

The following description of the invention will be better understood by having reference to the accompanying drawing, wherein:

FIG. 1 is a side view of a fishing lure which is made in accordance with the invention;

FIG. 2 is a top view of the fish body of the lure;

FIG. 3 is a bottom view of the fish body of the lure; and

FIG. 4 is a front end view of the fish body of the lure.

DETAILED DESCRIPTION OF THE DRAWING

With general reference to the drawing for like parts, and particular reference to FIG. 1, there is shown a fishing lure 10 which comprises a weighted fish body 11 which is formed of any suitable material, e.g. lead. The fish body 11 is cast around a 0.026" diameter stainless steel wire 12 which, at the front end or mouth 13 of the fish body 11, is formed in a loop or eyelet 14 to which any suitable fishing line 15 can be tied by a fisherman's knot. Extending backwardly from the rear end or tail 16 of the fish body 11, is a length of the wire 12 on which are conventionally and successively mounted, a number two nickel plated folded clevis 17 and attached number three French-style spin blade 18 with a nickel finish, a nickel plated hollow metal bead or bearing 19, transparent or fluorescent plastic beads 20, 21 and 22, a gold plated hollow metal bead 23 soldered together with the end of the wire 12 to form a strong, unseparable loop or eyelet 24 to which is attached a number 66 Eagle claw stainless steel, extra long shank fish hook 25, and colored fishair 26, if desired.

The fish body 11 is symetrical about a centerplane which vertically bisects the body when it is in the vertical position of FIG. 1. The fish body 11 has a sway-back or U-shaped topside 27 and a downwardly curved keel 28 which acts in much the same manner as the keel of a sailboat; namely, to stabilize the fish body 11 in an upright position as it moves through the water and prevent it from tipping over on its side or rotating in a plane which is normal to the direction of travel of the fishing lure 10. Neither of the above two adverse actions occurred during repeated tests of the lure 10 under actual fishing conditions. The keel 28 extends from the tail 16 to within about one-quarter of an inch from the mouth 13 of the fish body 11 which, measured at its centerline, is about 2¼–2½ inches, in length. The keel 28, like most boat keels, is fatter in the middle as best seen in FIG. 3, and comes to substantially a knife edge at its curved outer periphery.

The angular disposition of the wire 12 embedded in, and outside of, the fish body 11 was found to be of importance, as to how the fish body 11 rides through the water. The wire 12 within the fish body 11 has a shallow V-shape, the included angle A between the straight portions of the wire entering the mouth 13 and tail 16, being in the range of from 125 degrees to 135 degrees and, preferably, 130 degrees. The wire 12 is bent downward as it exits the tail 16 of the fish body 11, at an angle B which is in the range of from 5 degrees to 15 degrees, and is, preferably, 10 degrees.

The movement of the fish body 11 through the water is enhanced by flaring the front end 13 of the fish body 11, as best seen in FIGS. 2 and 3. The flared front end 13 provides a greater surface area for contact with the water. The angles C, D at which the front sides 29 and 30 diverge from the centerplane of the fish body 11, are identical and in the range of from 5 degrees to 15 degrees, and, preferably, about 9–10 degrees. The flared sides 29 and 30 act somewhat like the diving planes of a submarine, except that, in this instance, the flared diving planes 29 and 30 are fixed in the same plane which is inclined upwardly from the horizontal at an angle E in the range of from 35 degrees to 45 degrees and, preferably, 40 degrees, when the wire 12, trailing the fish body 11, is also in a horizontal plane. It should be understood that water flowing above and below the flared diving planes 29 and 30, acts to help stabilize the fish body 11 in an upright position, However, those skilled in the art of fishing can appreciate the rotational forces caused by the spinning blade 18 and acting against the fish body 11. If it weren't for the keel 28, these forces would cause the fish body 11 to rotate. These forces cause the fish body 11 to wobble which is affected as water strikes the flared front planes 29 and 30 to cause the fish body 11 to wiggle from side-to-side with the eyelet 24 acting as a pivotal point for oscillation of the fish body 11 as it moves through the water.

The fish body 11, as viewed from the front in FIG. 4, has an appearance much like that of the bow of a sailing vessel, although it was not intended to be that way. The depth D of the keel 28, measured "midship" so-to-speak, is about one-half the total depth of the fish body 11, measured at the same point.

The appearance of the fish body 11 is enhanced by painting it different colors. For example, the two side portions 31 can be painted a fluorescent orange, the remaining portions 32, including the keel 28, painted dark gray; the iris 33 painted black, and the surrounding eyeball 34 painted fluorescent green. Yellow or red beads 20–22 can be used in combination with orange fishair 26 to make the lure 10 colorful and attractive.

Thus, there has been described a unique fishing lure which has a totally different design which includes a stabilizing keel to maintain the body of the fishing lure in an upright, desired position, and prevent it from rotating as most fishing lures do. This novel lure has the big advantage of not needing a snap and swivel assembly which is required by most other lures. The size of the lure can be proportionately enlarged to catch larger species of fish, such as muskellunge.

What is claimed is:

1. A fishing lure, comprising a weighted body which is symmetrical about a centerplane which vertically bisects the body when the body is in an upright position, the body having, (i) a generally U-shaped topside, (ii) a mouth end in spaced relation from a tail end, (iii) a downwardly curved keel extending from the tail end and terminating short of the mouth end, the mouth end of the body having opposing longitudinal sides which flare outwardly from the centerplane of the body in a direction away from the tail of the body to form fixed planes above and below which water passes to help stabilize movement of the body through the water.

2. The fishing lure of claim 1, wherein the body has embedded therein, a wire bent in a V-shape wherein the included angle (A) is in the range of from 125° to 135°.

3. The fishing lure of claim 2, wherein the included angle (A) is 130°.

4. The fishing lure of claim 2, wherein the wire, embedded in the body, extends exteriorly of the tail end and is bent downwardly at an angle (B) which is the range of from 5° to 15°.

5. The fishing lure of claim 4, wherein the wire is bent downwardly at an angle B of 10°.

6. The fishing lure of claim 4, wherein the flared sides lie in the same plane which is at an angle (E) in the range of from 35°–45° from a parallel plane which contains the wire trailing the body.

7. The fishing lure of claim 6, wherein the flared sides are at an angle of 40° from the plane which contains the trailing wire.

8. The fishing lure of claim 6, wherein, the following parts are successively mounted on the wire which trails the body; namely, a clevis and attached spin blade, a metal bearing, a plurality of colored beads, and a fish hook.

9. A fishing lure, comprising:
(a) a generally U-shaped body having a centerplane which divides the body into two substantially symmetrical sections which are oppositely disposed relative to the centerplane, the body including a front end, the sides of which flare outwardly from the centerplane to form a pair of fixed planes which are disposed upwardly from the horizontal at an acute angle;
(b) a curved keel extending downwardly from the U-shaped body and symmetrical in relation to the centerplane, the curved keel being fatter in the middle and terminating at a substantially knife edge at the outer periphery of the keel and short of the front end of the body;
(c) a wire embedded in V-shaped relation within the body, the included angle (A) being in the range of from 125 degrees to 135 degrees, the wire extending from the tail end of the body and trailing the body;
(d) at least the following parts mounted on the trailing wire extending from the tail end of the lure; namely, a clevis and attached spin blade, a metal bearing, a plurality of colored beads, and a fish hook.

10. The fishing lure of claim 9, wherein the flared planes at the front end of the body are at an angle (E) of from 45 degrees to 55 degrees relative to a plane containing the trailing wire extending from the tail end of the body.

11. The fishing lure of claim 10, wherein the wire extending from the tail end of the body is bent downwardly from the adjacent wire within the body at an angle (B) of from 5 degrees to 15 degrees.

12. The fishing lure of claim 11, wherein the flared sides are at identical angles (C, D) of from 5 degrees to 15 degrees relative to the centerplane.

13. The fishing lure of claim 12, wherein the included angle (A) is 130 degrees, the angle (E) is 50 degrees, the angle (B) is 10 degrees, and the identical angles (C, D) are 9 degrees.

14. The fishing lure of claim 13, includes colored fishair to at least partially hide the hook.

* * * * *